May 31, 1966    J. G. STEED ETAL    3,253,353
APPARATUS FOR STUDYING WAVE PHENOMENA
Filed Sept. 12, 1963    3 Sheets-Sheet 1

INVENTORS
JAMES G. STEED
WILLIAM W. BLASE
BY
Treist, Lockwood, Greenawalt & Dewey
ATTYS.

May 31, 1966 J. G. STEED ETAL 3,253,353
APPARATUS FOR STUDYING WAVE PHENOMENA
Filed Sept. 12, 1963 3 Sheets-Sheet 2
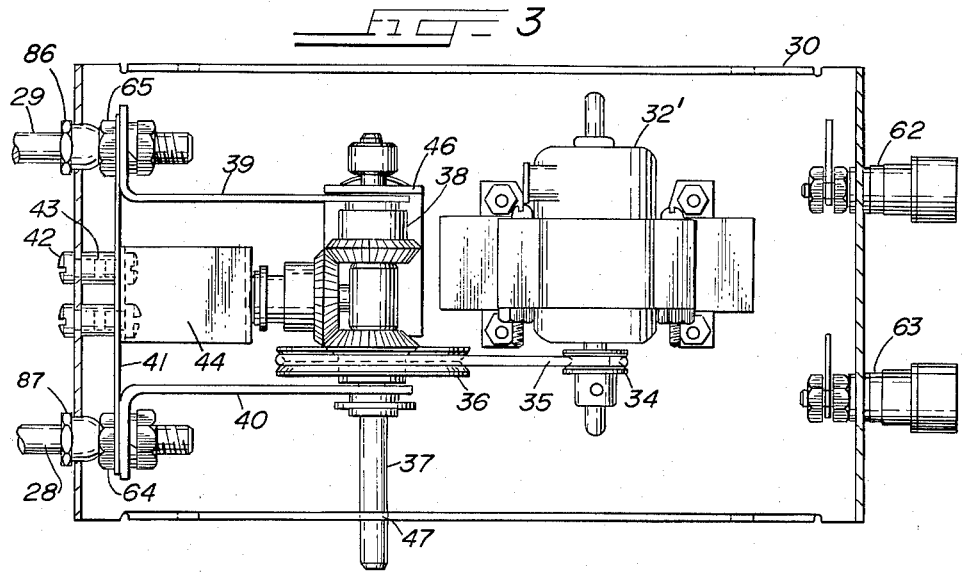
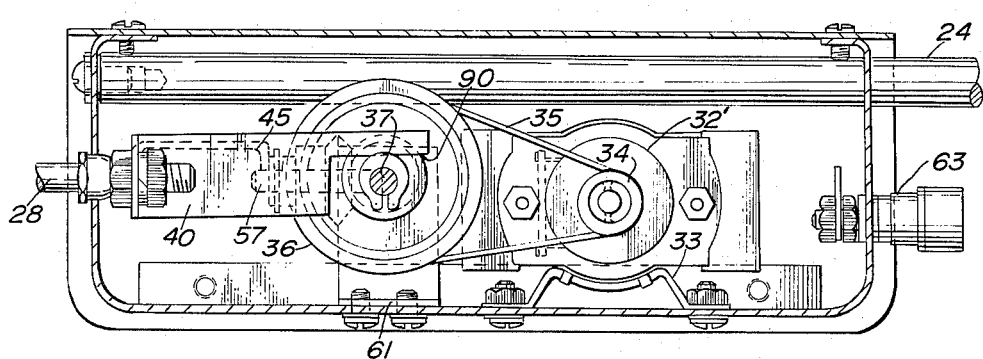
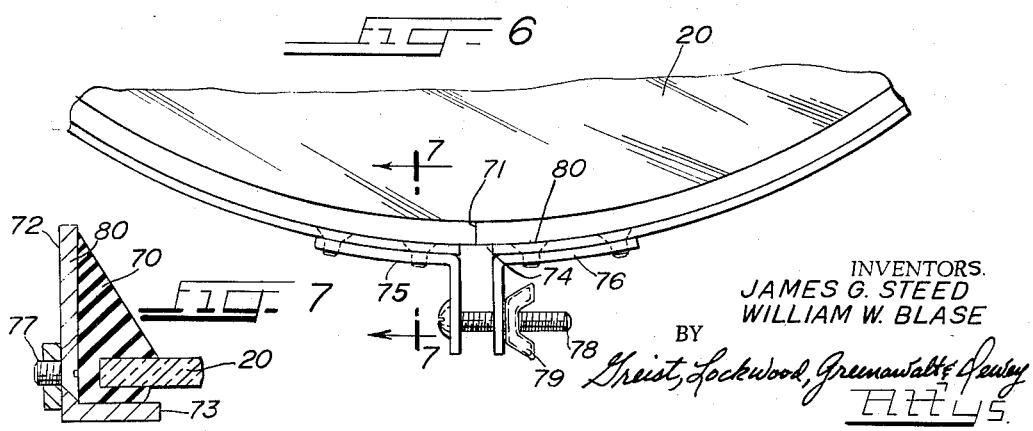
INVENTORS.
JAMES G. STEED
WILLIAM W. BLASE
BY

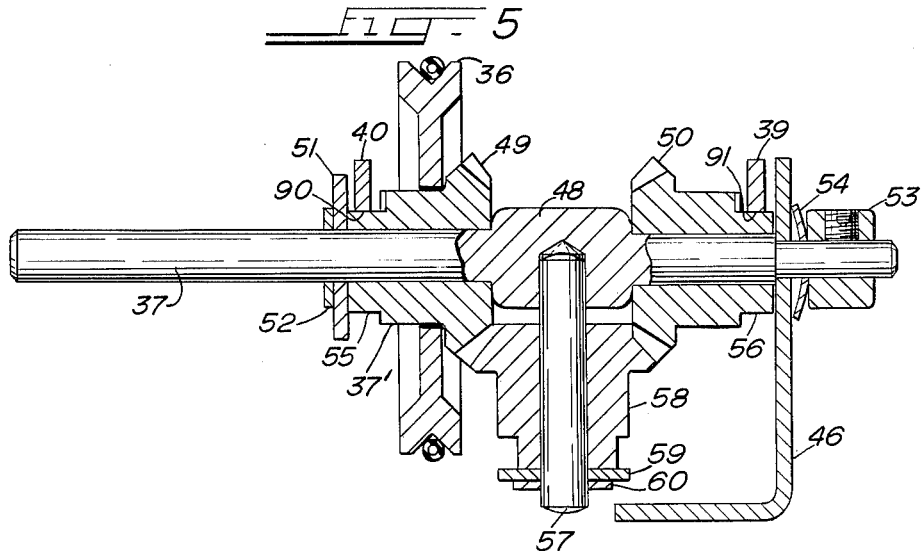
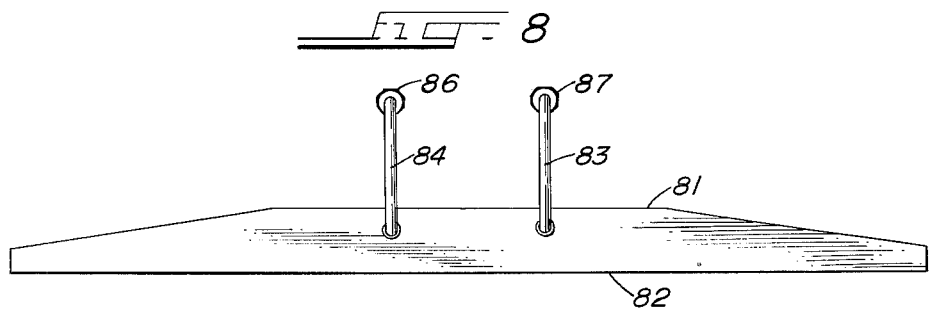
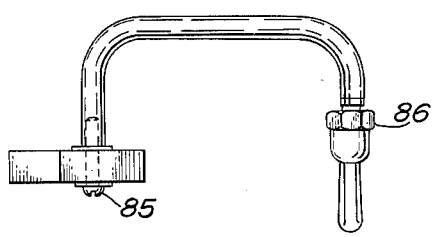
INVENTORS
JAMES G. STEED
WILLIAM W. BLASE

United States Patent Office 3,253,353
Patented May 31, 1966

3,253,353
APPARATUS FOR STUDYING WAVE PHENOMENA
James G. Steed, Elmwood Park, and William W. Blase, Chicago, Ill., assignors to The Welch Scientific Company, Chicago, Ill., a corporation of Illinois
Filed Sept. 12, 1963, Ser. No. 308,565
3 Claims. (Cl. 35—19)

This invention relates to a new and improved apparatus for studying wave phenomena. The importance of laboratory experiments as an aid in teaching is recognized by educators the world over. In this connectiotn it is of extreme importance to have equipment which is economical initially, yet rugged, durable and simply assembled to enable the student to perform experiments during a relatively short period. The new and improved apparatus of the instant invention is exceedingly flexible, being usable to perform a wide range of experiments while being of a unique simplified construction lending itself to low cost production without impairment of overall quality.

It is a principal object of this invention to provide a new and improved apparatus to study wave phenomena.

It is a further object of this invention to provide a novel tank formed with a transparent bottom disposed in a unique adjustable side frame with a novel gasket interposed which fluid-tightly cushion the transparent bottom at all times, as well as serving to dissipate waves generated.

It is a further object of this invention to provide a new and improved wave generator which is driven by a variable speed motor which in turn permits variation of the frequency of the wave generated.

It is a further object of this invention to provide a wave generator of uncomplicated construction, having a pair of wave sources associated therewith, and further being provided with means to vary the phase relationship of the sources between 0° and 180°.

It is a further object of this invention to provide a simplified wave generating mechanism which is readily adaptable to use with single and double point sources as well as a straight wave source with the changeover being easily accomplished.

Further and fuller objects will become readily apparent when reference is made to the accompanying drawings wherein:

FIG. 3 is a plan view of the wave generator of FIG. 2 with the top cover removed;

FIG. 4 is a side elevational view of the wave generator of FIG. 2 with the side plate removed;

FIG. 5 is an enlarged free body view of the differential gear assembly shown in FIG. 3;

FIG. 6 is a fragmentary plan view of a portion of the tank illustrating the split in the annular ring forming the side portions;

FIG. 7 is a cross sectional view taken along the lines 7—7 of FIG. 6;

FIG. 8 is a front elevational view of a straight wave generator; and

FIG. 9 is an enlarged side view of the straight wave generator of FIG. 8.

Figure 1:
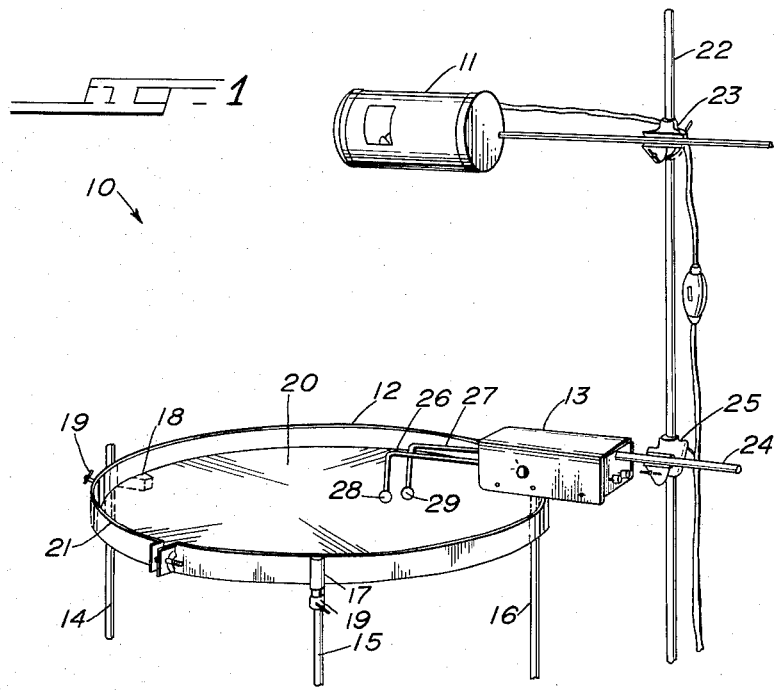
FIG. 1 is a schematic view of the wave generating apparatus utilizing a two point source.

Referring now to FIG. 1 the apparatus for studying wave phenomena is shown generally at 10 as including a light source 11, tank 12 and wave generator 13. The tank 12 would normally be positioned above a planar support surface such as a laboratory table or the like, on conventional stands (not shown) which support upright rods 14, 15 and 16. A series of brackets 17 and 18 are carried by the tank and slidably receive the rods. Suitable means such as a wing nut 19 is provided to clamp the rod at any desired elevation thus permitting the tank to be adjustably spaced with respect to the support surface. The tank is provided with a transparent bottom 20 which is tightly sealed to the side portion 21 to form a container for the liquid to be studied. The particular construction of the annular ring which forms the side portion 21 will be discussed in greater detail in conjunction with FIGS. 6 and 7.

The light source 11 may be adjustably supported on a rod 22 which also could serve as a tank support rod, by means of an adjustable clamp 23 permitting the light to be positioned above the tank as well as below in order to project the generated waves on the ceiling. A cover on the light source has circular and rectangular openings which may be selected to give point or line source illumination respectively.

The wave generator 13 is supported by means of a support rod 24 slidably received in an adjustable clamp 25 enabling the wave generator to be extended to any position over the tank 12. A pair of arms 26 and 27 extend from the casing 30 outwardly over the tank, and downwardly into the liquid. A pair of spheres 28 and 29 are connected at the lower extremity of the arms 26 and 27 to provide point sources for generation of waves as will be described later in great detail. The wave generator mechanism moves the arms 26 and 27 vertically in the water to produce the wave, without the sources actually leaving the water surface. In the two point source arrangement shown, the phase relationship of the arms may be varied between 0° and 180°, with any setting therebetween being obtained by proper setting of a manually adjustable control.

Figure 2:
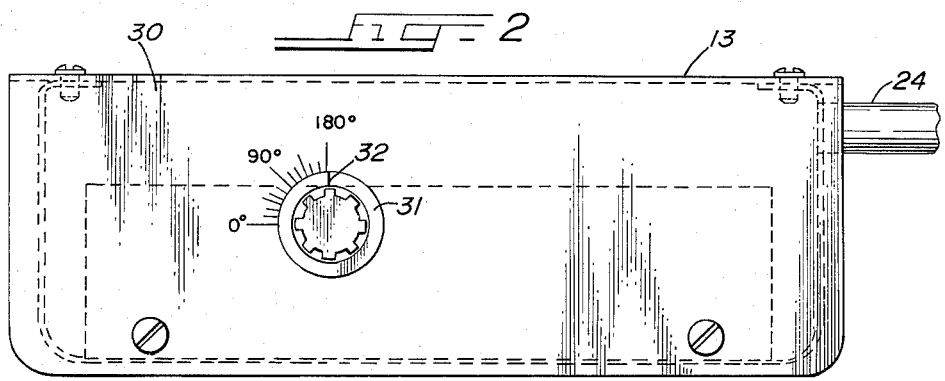
FIG. 2 is an enlarged elevational view of the wave generator of FIG. 1.

Referring now to FIG. 2, the wave generator 13 has a casing portion 30 formed of suitable material such as sheet metal. A rotatable knob 31 overlies a portion of one side of the casing 30 and has indicia means 32 thereon cooperating with a series of indicia carried by the casing 30, the latter being angularly spaced 90° in this embodiment. In the absence of a means to limit the angular adjustment of the knob, it could be rotated a full 360°, rotating the cams an equal amount in opposite directions thereby allowing phase adjustment from 0° to 720° if desired.

As seen in FIGS. 3–5 the wave generator 13 is provided with a motor 32', attached to the bottom of the casing 30 through a mounting bracket 33. One of the projecting shafts of the motor 32' receives a grooved pulley 34 with an associated belt 35 which drives a similarly grooved pulley 36. A shaft 37 rotatably supports pulley 36 to drive a differential mechanism indicated generally at 38 which will be more completely described in connection with FIG. 5. A pair of pivot arms 39 and 40 extend from the opposite sides of the differential mechanism 38 to a pivot spring 41 which is mounted on the casing 30 by means of fasteners 42 and cooperating spacers 43 and carries a pair of female banana plugs 64 and 65 to receive the removable male plugs on the arms 28 and 29. Fasteners 42 also serve to support a stop bracket 44, which has an inturned flange portion 45 shown in dotted lines in FIG. 5. The shaft 37 and associated components carried thereby are supported by an angle bracket 46 on one side and an aperture 47 in the casing side wall.

As seen in FIG. 5, an enlarged central portion 48 on the shaft 37 provides an abuttment for each of the rotatable miter gears 49 and 50 forming a part of the differential mechanism 38. The gears 49 and 50 are held in abutting engagement with the enlarged central portion 48 through a bearing washer 51 and a grip ring 52 on one side, and a set screw collar 53 abutting a tension washer 54 acting through the support bracket 46 on the other side. Pulley 36 is concentrically positioned about a cylindrical portion 37' of the gear 49 in a driving manner, with suitable means such as a liquid cement fastening the two together for rotation. The outer end of the gear 49 is provided with a cam surface 55, which cooperates with the pivot arm 40. Gear 50 is provided with a similar cam surface 56 to cooperate with pivot arm 39. In the position shown, the low point of the cams 55 and 56 are in engagement with the under side or cam followers 90 and 91 on the pivot arms 40 and 39, respectively.

A sun gear support shaft 57 is received in the enlarged portion 48 of the shaft 37 by a press fit, to rotatably carry a sun gear 58 in meshing engagement with each of the gears 49 and 50. Bearing washer 59 and grip ring 60 hold the sun gear on the shaft 57 so that on rotation of the pulley 36, the gear 49 will rotate about shaft 37, with the rotation being transferred through the sun gear 58 to the gear 50. During such rotation the cam surfaces 55 and 56 rise and fall, causing the pivot arms 39 and 40 to rise and fall, since the pivot spring 41 constantly urges the pivot arms 39 and 40 into engagement with their respective cam surfaces. The wave generating arms 28 and 29 will rise and fall also, since they are carried by the pivot spring 41 thereby generating wave motion when immersed in a liquid.

If it is desired to adjust the cam surfaces with respect to each other thereby to place each of the wave generating arms 28 and 29 out of phase, it merely becomes necessary to rotate the shaft 37 angularly in a clockwise direction. Rotation of the shaft through an arc of 90°, causes gear 49 to move angularly 90° in one direction and the gear 50 to move in an opposite direction angularly 90°, due to the rotary motion transmitted from the sun gear 58. Since the cam surfaces are integral with the gears 49 and 50, they are displaced an equal amount relative to each other. Obviously, rotation of each of the cam surfaces 90° in opposite directions serves to displace the cam surfaces 180° out of phase with respect to each other thus placing pivot arms 39 and 40 out of phase also. Once the cams are displaced relative to each other, they will remain so, inasmuch as they are running at the same rate. Any angular adjustment of the shaft 37 between 0° and 90° may be achieved through the use of the indicia means on the casing 30 and knob 31.

In order to insure accurate angular adjustment the inturned portion 45 of the stop bracket 44 engages the end of the shaft 57 at the 180° out of phase limit. In the in phase position, the end of the shaft 57 engages a limiting surface 61 on the support bracket 46, which is formed by an L-shaped section being removed from the base of the angle bracket 46 substantially in line with the rotational travel of the shaft 57.

A pair of terminals 62 and 63 are provided in the end of the case opposite the wave generator arms 28 and 29. The terminals facilitate ease in making electrical connection to the motor 32', and are provided internally with conducting wires (not shown) to the motor terminals. Suitable means such as a six-volt battery with a variable resistance in one side of the exterior lines may be provided to supply adjustable voltages to the motor. It is contemplated that voltage adjustment through a range of 1.3 to 6 volts will serve to adjust the motor speed from six to fifty cycles per second permitting a wide selection in wave frequencies.

Referring now to FIGS. 6 and 7, the novel tank construction will be described. The enlarged view of FIG. 6 shows a fragmentary section of the transparent bottom which may be glass or the like to permit light waves to pass therethrough. The glass is of circular configuration and as seen in FIG. 7 is surrounded on its peripheral edge by sealing gasket 70. The ends of the gasket are brought into abutting engagement as at 71, being joined through a cemented butt joint or the like. The assembly is then placed in the annular ring-like frame, which as seen in cross section in FIG. 7, comprises an upstanding side portion 72 and a lower ledge 73 to support the glass. The gasket, which is generally triangular in cross section, forms a sloping shore line around the inner circumferential portion of the tank. The frame is split as at 74 to facilitate adjustment through the use of a pair of angle brackets 75 and 76 affixed to the frame by threaded fasteners 77. The angle brackets 75 and 76 are provided with apertures to receive a bolt 78 having a wing nut 79 thereon to vary adjustment of the dimension of the gap 74, thus placing the peripheral gasket 70 in tight engagement with the side wall portion 72. The split 74 in the annular frame is covered by means of the upstanding portion 80 of the gasket while the lower portion thereof tightly grips the glass to form a fluidtight joint. The uniform slope of the upstanding portion of the gasket acts as a baffle much in the same fashion as the sloping shore on a large body of water.

In one specific embodiment the transparent bottom was formed of optically flat glass plate over 56 centimeters in diameter and 0.6 centimeter thick. The side portion 21 extended upwardly approximately two and one-half (2½) centimeters to provide ample depth for test liquids, which are normally of a depth of the order of 5 to 7 millimeters. The circular construction of the tank affords benefits in the study of wave phenomena heretofore unknown, in that no absorbing dampers are required around the circumference of the tank. Straight and circular waves are dissipated, extraneous reflections are baffled, and undesirable side wall reflections, which are a common experience with construction other than a circular configuration, are avoided. In addition, the accurate center of the tank may be established by merely tapping the side wall, causing circular waves which converge on a common point source at the geometric center of the tank. The straight wave generator of FIGS. 8 and 9 comprises an elongated paddle 81 having a straight lower edge or water engaging portion 82 with a pair of support arms 83 and 84 affixed to the paddle 81 through means of fasteners 85. The support arms 83 and 84 are generally U-shaped as viewed in side elevation, and are equipped at their extremities with a pair of male banana plugs 86 and 87 for insertion in the cooperating female portions 64 and 65 carried by the pivot spring 41. The paddle may be formed of wood or other light weight materials, with a hard wood such as maple or birch being preferable.

An experiment requiring a single source of wave generation may be performed by inserting arm 26 in one of the receptacles 64 or 65 with tank, wave generator and light source in the relative positions shown in FIG. 1. The light source 11 is adjusted to define a point source, and may be placed 50 centimeters above the tank. The point source or sphere 28 on the arm 26 is adjusted so that at the upper end of its stroke it just breaks the water surface, since under ideal test circumstances it is desirable that the point produce a wave without actually leaving the water surface. The wave generator may then be energized, and a series of waves forming crests and troughs will be generated. By varying the voltage to the motor, the frequency of waves may be selectively adjusted from 6 to 50 cycles per second.

Experiments with a two point source may be performed in a manner similar to the one point source, however both arms 26 and 27 are inserted in their respective receptacles in the wave generator 13. By merely rotating the spheres 28 and 29 on the arms 26 and 27, the distance between sources may be varied from 1 to 15 centimeters. At 0° phase adjustment both sources dip into the water at the same time forming crests and troughs which are in phase. When the frequency is constant the distance between crests is constant for both sources. The super position of these two periodic waves form interference patterns and nodal lines are established with the number being determined by the ratio of wave length to source separation. Sources which are in phase will produce an even number of nodal lines arranged symmetrically about a center line. Through phase delay, made possible by turning the phase shift knob from its 0° setting through 180°, different interference patterns may be established for variant phase relationships obtaining an asymmetrical arrangement of nodal lines. Plots of wave patterns may be made on paper positioned under the tank 12.

The straight wave source 81 may be attached to the wave generator 13 by removing the arms 26 and 27, and inserting the male plugs 86 and 87 in the receptacles provided. It is essential that the phase adjustment be at 0° when the straight wave generator is used. The wave generator 13 is adjusted in elevation so that the entire edge 82 of the wooden paddle 81 just penetrates the water surface, with the ends of the paddle approximately 1 centimeter from the edge of the circular tank 12. In operation, the paddle generates a reciprocating pattern that pushes out repetitive straight waves, with the tank 12 baffling extraneous waves reflected from behind the bar. In each of the above test setups, various forms of shoals such as prisms, lenses and the like may be placed in the tank to allow the student to study wave behavior under more complex circumstances.

Through the use of the unique arrangement described above, students will readily recognize that water crests act as converging lenses and the trough acts as concave diverging lenses. The focusing images on a screen is always a function of focal length of these lenses. As the frequnecy, amplitude and wave length of the water lengths change there follows a corresponding change in the shape of these water lenses. Through the use of a fine light source, adjustment may be made for the optimum image formation when the frequency of the wave is changed. The study of water waves exhibits a phenomena of reflection, refraction, dispersion, defraction and interference in a very graphic manner, which is typical of wave behavior thus enabling the student to more effectively understand the study and property of light and other electro magnetic radiations.

While a single illustrative embodiment has been discussed in the foregoing description and disclosed in the appended drawings it will be immediately apparent to the skilled artisan that a number of modifications could be made to the illustrated embodiment without departing from the true spirit and scope of the invention. It is therefore desired that any limitations imposed be within the spirit and scope of the following claims.

We claim:
1. A wave generator comprising a casing, a generally flat pivot spring supported by said casing, a pair of wave generating arms removably mounted on opposite sides of said flat pivot spring by means of co-operating male and female plug connections, a pair of pivot arms, each of said pivot arms having one end fixed to said flat pivot spring with the other end having a cam follower surface thereon, a pair of rotatable cam means, each of said cam means being in engagement with each of said follower surfaces on each of said pivot arms, and means to rotate said cam means to move said pivot arms and transmit a wave generating motion to said flat pivot spring.

2. The wave generator of claim 1 wherein said means to drive said cam means includes first and second miter gears shaped to a cam surface and engaging said cam follower surfaces on said pivot arms, and a third miter gear in meshing engagement with said first and second gears to transmit rotary motion from one of said gears to the other.

3. The wave generator of claim 2 wherein said third miter gear is positioned on a shaft having an axis at right angles to the axis of rotation of said first and second gears, and means is provided to rotate the shaft of said third gear angularly relative to the axis of rotation of said first and second gears thereby to rotate said first and second gears in opposite directions to vary the phase relationship between said cam means carried by each of said first and second gears and the phase relationship between said wave generating arms.

References Cited by the Examiner
UNITED STATES PATENTS

| | | | |
|---|---|---|---|
| 770,300 | 9/1904 | Meinel | 84—104 |
| 800,552 | 9/1905 | Converse | 84—104 X |
| 1,620,006 | 3/1927 | Burlin | 119—5 |
| 1,871,215 | 8/1932 | Keller et al. | 4—172 |
| 2,002,043 | 5/1935 | Price | 4—172 |
| 2,209,108 | 7/1940 | Briggs | 74—54 X |
| 2,222,010 | 11/1940 | Witte et al. | 35—19 X |
| 2,515,171 | 7/1950 | Abel | 35—19 X |
| 2,883,085 | 4/1959 | Rose et al. | 220—82 |
| 3,088,627 | 5/1963 | Saunders | 220—82 |
| 3,142,908 | 8/1964 | Annis et al. | 35—19 |
| 3,193,847 | 7/1965 | Mashura | 4—172 |

EUGENE R. CAPOZIO, *Primary Examiner.*

HARLAND S. SKOGQUIST, *Assistant Examiner.*